United States Patent [19]

Phelps et al.

[11] Patent Number: 4,512,018

[45] Date of Patent: Apr. 16, 1985

[54] SHIFTER CIRCUIT

[75] Inventors: Andrew E. Phelps; Allen Ta-Ming Wu, both of San Diego, Calif.

[73] Assignee: Burroughs Corporation, Detroit, Mich.

[21] Appl. No.: 473,274

[22] Filed: Mar. 8, 1983

[51] Int. Cl.³ .............................................. H04J 3/00
[52] U.S. Cl. ................................................... 370/112
[58] Field of Search .................................. 370/77, 112

[56] References Cited

U.S. PATENT DOCUMENTS

| | | | |
|---|---|---|---|
| 3,821,480 | 6/1974 | Dundon et al. | 370/112 |
| 4,157,458 | 6/1979 | Roche | 370/112 |
| 4,317,198 | 2/1982 | Johnson | 370/112 |
| 4,409,683 | 10/1983 | Woodward | 370/112 |
| 4,467,444 | 8/1984 | Harmon, Jr. et al. | 364/900 |

Primary Examiner—Douglas W. Olms
Assistant Examiner—Kenneth I. Rokoff
Attorney, Agent, or Firm—Charles J. Fassbender; J. Ronald Richbourg; Kevin R. Peterson

[57] ABSTRACT

A new and improved shifter circuit for multiplexing bytes of data into various orders on a finite size bus is disclosed. The improved shifter circuit includes an array of barrel shifter circuits arranged into N groups of M shifter circuits per group wherein each shifter circuit has P data input terminals and P output terminals. The letters N, M and P represent integers. Each of the P output terminals of each of the M shifter circuits in a group are coupled to one another, respectively, so as to form N×P output terminals of the array.

12 Claims, 5 Drawing Figures

| CONTROL LINE Hi | $x_{24}=$ | $x_{16}=$ | $x_8=$ | $x_0=$ |
|---|---|---|---|---|
| 16d | $a_{24}$ | $a_{16}$ | $a_8$ | $a_0$ |
| 16c | $a_0$ | $a_{24}$ | $a_{16}$ | $a_8$ |
| 16b | $a_8$ | $a_0$ | $a_{24}$ | $a_{16}$ |
| 16a | $a_{16}$ | $a_8$ | $a_0$ | $a_{24}$ |

SHIFTER CIRCUIT

BACKGROUND OF THE INVENTION

1. Field of the Invention

The present invention generally relates to digital data processing devices and, more particularly, to a shifter circuit for multiplexing bytes of data into various orders on a finite size bus.

2. Prior Art

In byte-slice digital data processing devices, the bytes of data (eight bits to a byte) are often scrambled from one order of bytes to another. The term "order" as used herein refers to the digital position of a byte of data such as high-order versus low-order position. When it becomes necessary to transfer a multiple-byte word along a data path to other devices or parts of a device, it may also be necessary to rearrange the order of the bytes into a preferred positional arrangement.

More particularly, in computer systems having large memories, it is desirable to group bytes of digital information into units or words large enough to efficiently perform error detection and correction. In addition, to avoid placing undue constraints on the software, it is desirable to randomly select bytes, half words or words from the memory. That is, the memory addressing is arranged so that it is possible to select any contiguous group of one, two or four bytes. To aid in doing this, the memory is divided into odd and even 32-bit words. However, this odd-even organization scheme must be disguised from the software. To this end, it is necessary to rearrange the order of the bytes into the order in which the software expects them to be written in the memory; that is, the order as originally written by the software. Hence, a circuit is required for rearranging the byte order.

One such prior art circuit used in byte rearranging is shown in FIG. 1. Two 32-bit buses 11 and 12 are each organized into four sub-buses 13 through 20 and are disposed for transmitting the four bytes supplied on each of the buses. The sub-buses are coupled to input terminals of four 64-to-8 multiplexor circuits 22, 23, 24 and 25. The eight-bit outputs of these multiplexor circuits are coupled in parallel so as to form a 32-bit output bus 26. Each of the four multiplexors 22, 23, 24 and 25 operate in response to three control signals coupled to each of the multiplexors on lines 28, 29, 30 and 31, respectively.

More specifically, the sub-buses 13 through 20 are coupled sequentially to the input terminals of the multiplexor 22. That is, the first byte on the first sub-bus 13 is coupled to the first byte input terminals A of the multiplexor 22, the second byte on the second sub-bus 14 is coupled to the second byte input terminals B of the same multiplexor 22, and so forth for the remaining bytes. However, the sub-bus couplings to the multiplexor 23 are shifted by one byte from that of the multiplexor 22. That is, the sub-bus 13 is coupled to the input terminal D of the multiplexor 23; the sub-bus 14 is coupled to the input terminal A of the multiplexor 23; etc. In a similar manner, the sub-bus couplings to the multiplexor 24 are again shifted by one byte, and the sub-bus couplings to the multiplexor 25 are shifted yet again by one byte to complete all possible byte arrangements for a bus.

In response to the control signals on the lines 28 through 30, the multiplexors 22 through 25 select one set of the input terminals to be coupled to the output terminals of the multiplexor. A shifter circuit as illustrated in FIG. 1 and described above requires a large number of input lines having many cross-overs. Thus, such a circuit becomes a very large and slow circuit when reduced to an integrated circuit.

SUMMARY OF THE INVENTION

An object of this invention is to provide a simple and fast, yet economical, byte shifter circuit. An array is provided which comprises shifter circuits arranged into N groups of M shifter circuits per group wherein each shifter circuit has P data input terminals, P control input terminals and P output terminals. The letters N, M and P represent integers. Each of the P output terminals of each of the M shifter circuits in a group are coupled to one another, respectively, so as to form N×P output terminals of the array.

Moreover, the individual shifter circuits used in the array of this invention each comprise P columns by P rows of transistor switching means, each having an input and an output terminal and a control element wherein the control element of each switching means in a row is coupled to corresponding ones of the P control input terminals. The input terminals of each of the transistor switching means in a column are coupled to corresponding ones of the P data input terminals, and the output terminals of each of the transistor switching means in a row are coupled to respective ones of the P output terminals shifted in position as a function of control signals supplied on the P control input terminals.

DETAILED DESCRIPTION OF THE INVENTION

Figure 1:
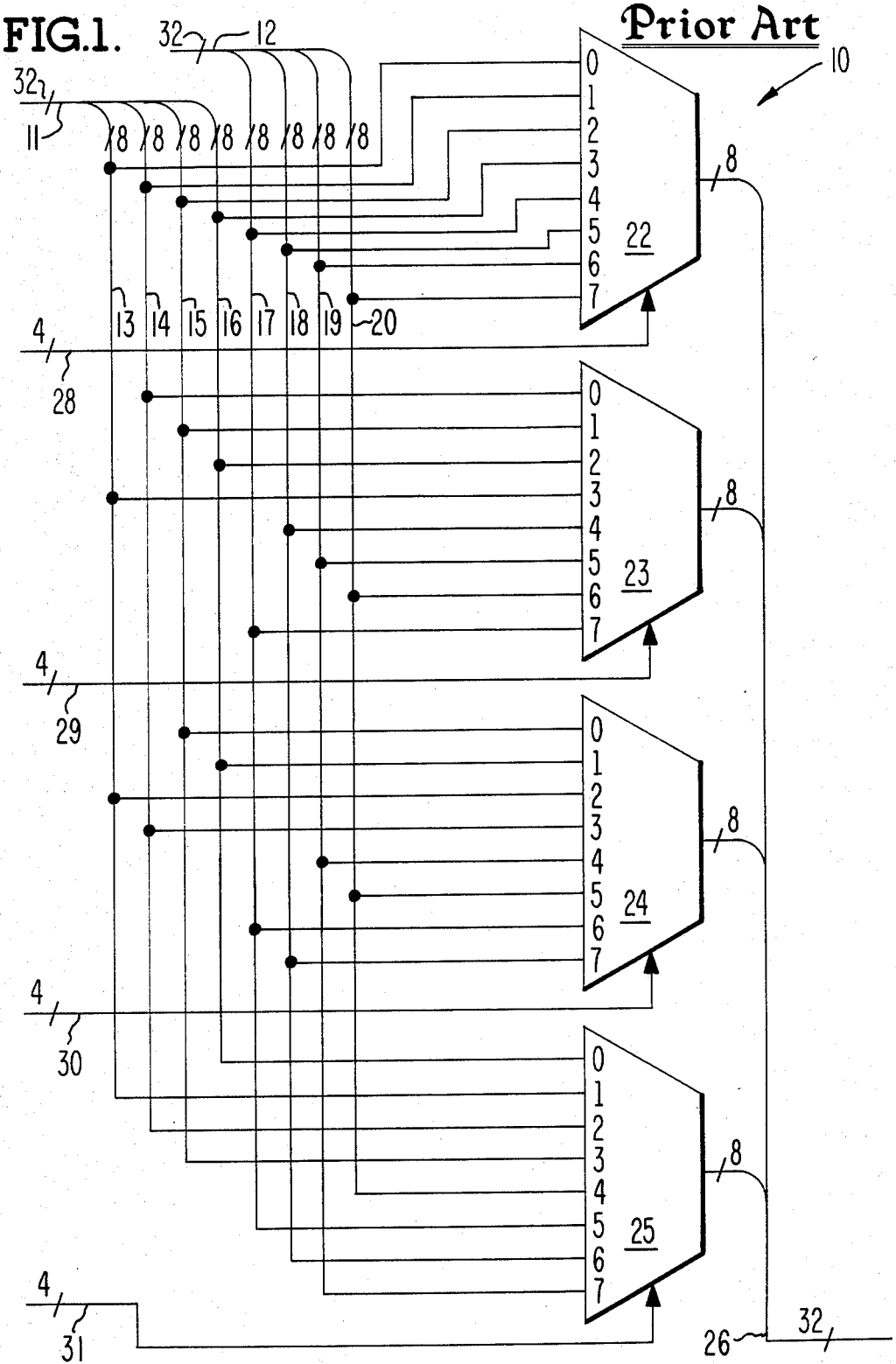
FIG. 1 is a block diagram of a prior art solution to the problem solved by this invention.
Figure 2:
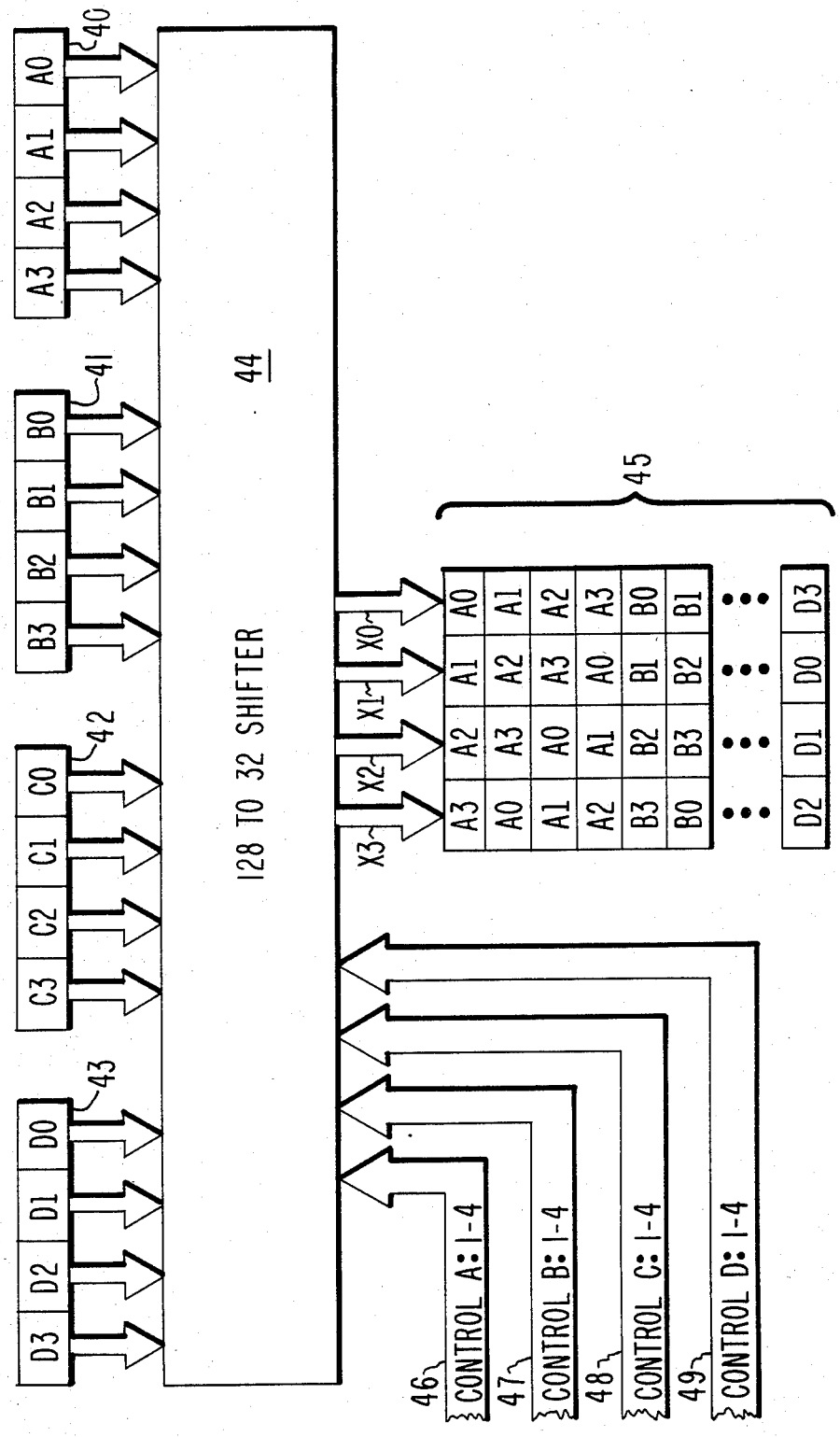
FIG. 2 is a block diagram of the present invention.

Referring now to FIG. 2, a block diagram of the present invention is illustrated. Registers 40, 41, 42 and 43 are coupled to a 128-to-32 shifter 44. Block 45 represents the various combinations of output states provided on output lines X0, X1, X2 and X3. In one embodiment, the registers 40, 41, 42 and 43 are each capable of storing 32 bits or four bytes. Each byte is referred to herein by a letter (e.g., "A") followed by a number 0 through 3. For example, the first byte stored in the register 40 is referred to as A0, the second byte is referred to as A1, etc.

It is the function of the shifter 44 to supply various arrangements of the order of the bytes stored in the registers 40, 41, 42 and 43 on the output lines X0, X1, X2 and X3 as a function of control signals supplied on input lines 46, 47, 48 and 49. Typically, the shifter 44 is useful in digital data processing systems having a byte slice data path wherein the data may have been scrambled in various orders of arrangement and is required to be rearranged into a preferred order. It should be noted that the registers 40, 41, 42 and 43 are illustrative only and are not an essential part of the invention. Also, it is noted that the order in which the bytes appear on the output lines X0, X1, X2 and X3 are by way of example only.

Figures 3, 4:
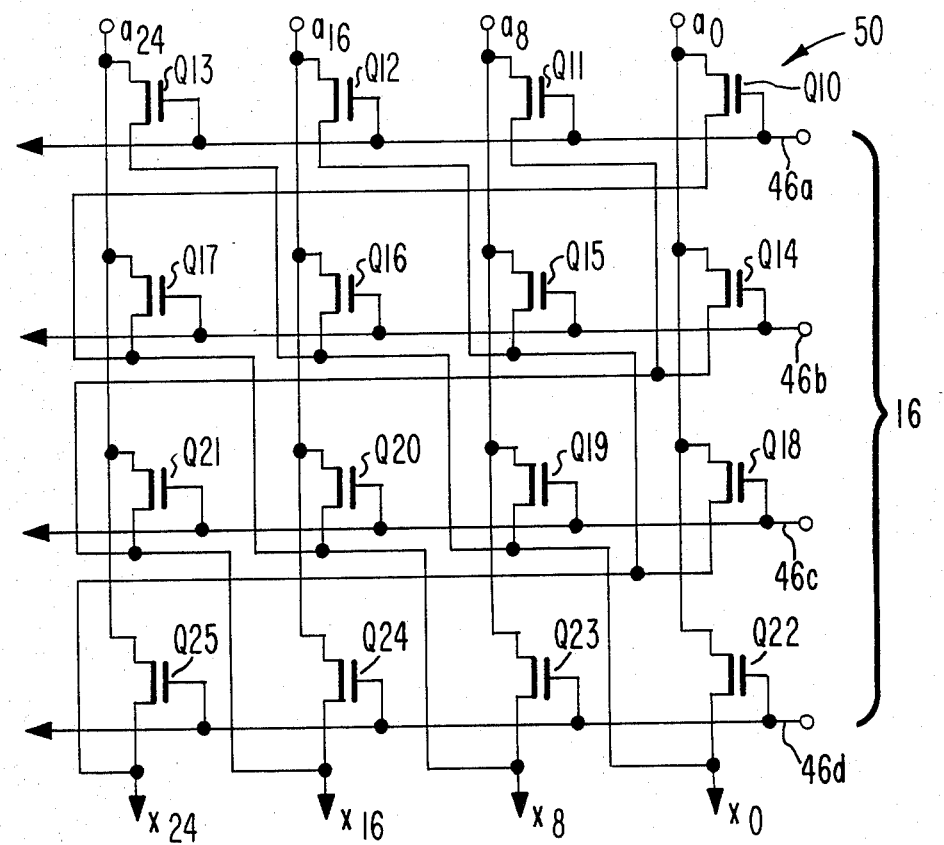
FIG. 3 is a schematic diagram of an individual barrel shifter used in this invention.
FIG. 4 is a table illustrating operation of the barrel shifter shown in FIG. 3.

Referring now to FIG. 3, a barrel shifter 50 is shown, which is a basic building block used in constructing the shifter 44. Typically, the barrel shifter 50 is a matrix of n-channel enhancement mode MOSFETs (Metal Oxide Semiconductor Field Effect Transistor). It is noted that either CMOS or pMOS technology may also be used to implement the barrel shifter 50. The term "barrel shifter" is used herein to mean a circuit for performing a multiplexing function as more particularly described on page 157 et seq in a textbook entitled "Introduction to VLSI Systems" by Carver Mead and Lynn Conway, which is published by Addison-Wesley Publishing Company.

In particular, the gate electrodes of the first row of MOSFETs Q10, Q11, Q12 and Q13 are coupled to a first control signal line 46a of the control signal input lines 46. The gate electrodes of the second row of MOSFETs Q14, Q15, Q16 and Q17 are coupled to a control signal line 46b; the gate electrodes of the third row of MOSFETs Q18, Q19, Q20 and Q21 are coupled to a control signal line 46c; and, the gate electrodes of the fourth row of MOSFETs Q22, Q23, Q24 and Q25 are coupled to a control signal line 46d.

The source terminals (i.e., input terminals) of Q10, Q14, Q18, Q22 (i.e., first column of MOSFETs) are coupled to a first bit "$a_0$" of the first byte "A0" stored in the A REG. (register 40). In a similar manner, the source terminals of Q11, Q15, Q19 and Q23 are coupled to a first bit "$a_8$" of the second byte "A1" stored in the A REG.; the source terminals of Q12, Q16, Q20 and Q24 are coupled to a first bit "$a_{16}$" of the third byte "A2" stored in the A REG.; and, the source terminals of Q13, Q17, Q21 and Q25 are coupled to a first bit "$a_{24}$" of the fourth byte "A3" stored in the A REG.

The source terminals of the fourth row MOSFETs Q22, Q23, Q24 and Q25 are coupled to output lines $x_0$, $x_8$, $x_{16}$ and $x_{24}$, respectively, of the barrel shifter 50. The source terminals of the third row MOSFETs Q18, Q19, Q20 and Q21 are coupled to output lines $x_{24}$, $x_0$, $x_8$ and $x_{16}$, respectively. In other words, the third row source terminal outputs are shifted one position to the right from the positions in the fourth row, wherein "right" is used in a conventional sense when viewing the drawing in the usual manner. In a similar fashion, the second row source terminal outputs are shifted one position to the right from the third row positions. Finally, the first row source terminal outputs are shifted one position to the right from the second row positions.

Accordingly, it may be appreciated from the discussion hereinabove, that the data bits supplied on the input lines $a_0$, $a_8$, $a_{16}$ and $a_{24}$ will appear in the same order at the output terminals $x_0$, $x_8$, $x_{16}$ and $x_{24}$, respectively, when the control line 46d is at a high level, while the other control lines 46a, 46b and 46c are at a low level. The shifting operation may be more fully appreciated with reference to the chart shown in FIG. 4, wherein the above-described operation is shown in the first row adjacent 46d. When the control signal line 46c is at a high level, the data bits $a_0$, $a_8$, $a_{16}$ and $a_{24}$ are shifted one position to the right with the bit $a_0$ being looped back to the high order position ($X_{24}$). The remaining control signals effect shifting of the input bits in a similar fashion.

Figure 5:
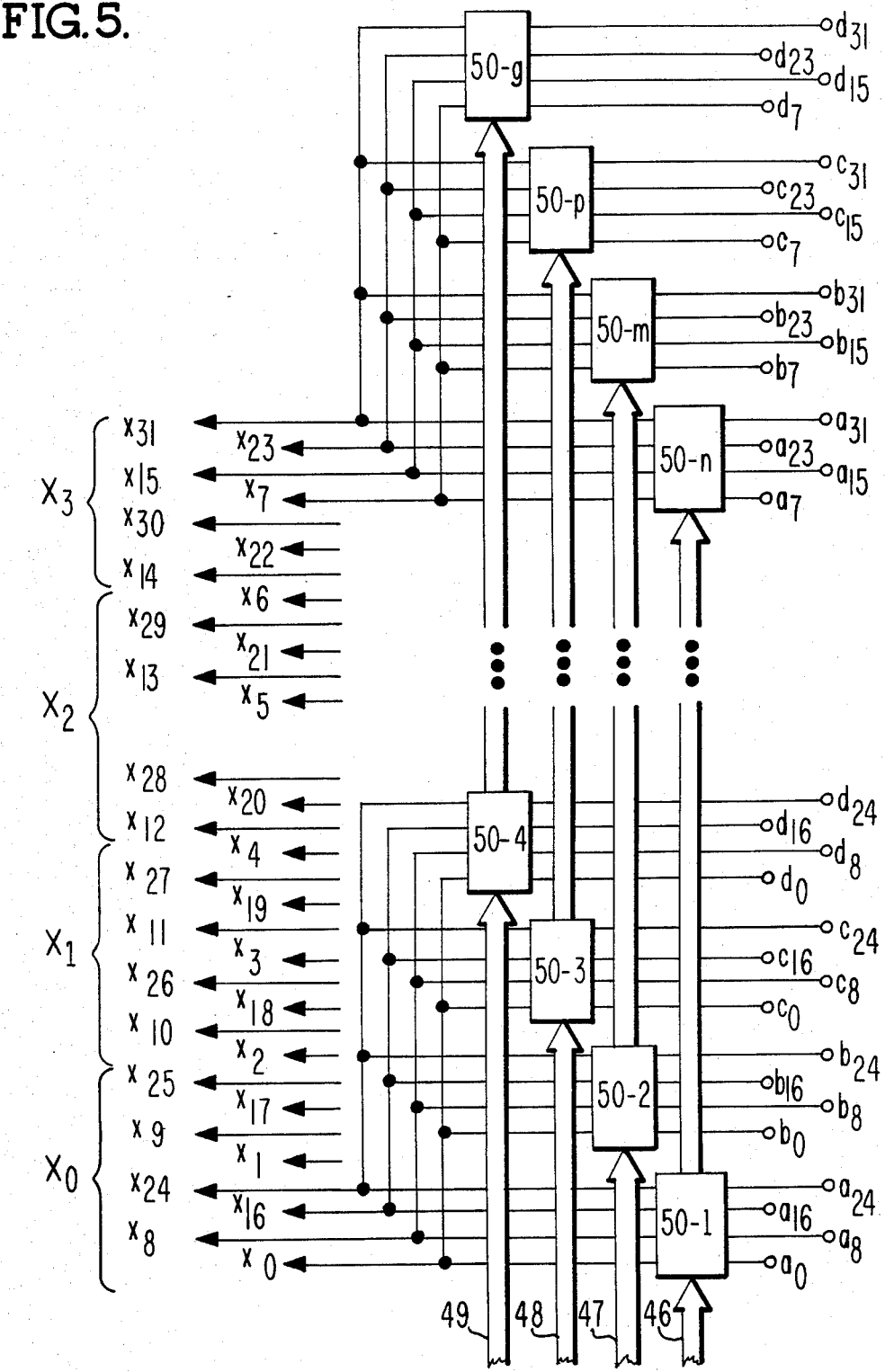
FIG. 5 is a more detailed block diagram of the invention.

Referring now to FIG. 5, the shifter 44 (FIG. 2) is shown in block-diagram form wherein a multiplicity of barrel shifters, such as the shifter 50, are arranged in an array. In the illustrated embodiment, barrel shifters 50-1, 50-2, 50-3 and 50-4 are disposed for receiving the first bits of each of the bytes A0, A1, A2, A3, B0, B1, . . . D2, D3. Barrel shifters 50-n, 50-m, 50-p and 50-q are disposed for receiving the last bits of each of the same set of bytes. Hence, in this embodiment there are eight sets of barrel shifters with four such shifters per set. It is noted that other arrangements of inputs can yield various results.

The control input signal lines 46 are coupled to the barrel shifters 50-1 . . . 50-n, the lines 47 are coupled to the barrel shifters 50-2 . . . 50-m, the lines 48 are coupled to the barrel shifters 50-3 . . . 50-p, and the lines 49 are coupled to the barrel shifters 50-4 . . . 50-q.

The output terminals of the four barrel shifters per set of shifters are coupled together so as to form four output terminals per set. With reference to the first set, the output terminals of the barrel shifters 50-1, 50-2, 50-3 and 50-4 are coupled together, forming output terminals $x_0$, $x_8$, $x_{16}$ and $x_{24}$. The next four barrel shifters (not shown) are coupled in a similar manner to form output terminals $x_l$, $x_9$, $x_{17}$ and $x_{25}$, et seq. In the embodiment illustrated in FIG. 5, bracket X0 represents the low-order byte, which as shown includes the output terminals $x_0$, $x_8$, $x_{16}$, $x_{24}$, $x_1$, $x_9$, $x_{17}$ and $x_{25}$. The bracket X1 represents the next higher order byte, which includes the output terminals $x_2$, $x_{10}$, $x_{18}$, $x_{26}$, $x_3$, $x_{ll}$, $x_{19}$ and $x_{27}$. The brackets X2 and X3 represent the remaining bytes as illustrated. It is noted that various other combinations of bits in each byte can be readily accomplished as desired.

While the invention has been particularly shown and described with reference to a preferred embodiment, it will be understood by those skilled in the art that the foregoing and other changes in form and details may be made without departing from the spirit and scope of the invention. It is intended, therefore, to be limited only within the metes and bounds of the appended claims.

We claim:

1. An array of shifter circuits arranged into N groups of M shifter circuits per group wherein both N and M are integers greater than one, each shifter circuit has P data input terminals, P control input terminals and P output terminals, where P is a positive integer, each of said P output terminals of the M shifter circuits in a group being coupled to one another, respectively, so as to form N×P output terminals of said array; each of said shifter circuits comprising P columns by P rows of transistor switching means, each having an input and an output element and a control element wherein the control element of each switching means in a row is coupled to corresponding ones of the control input terminals, the input element of each of the transistor switching means in a column being coupled to corresponding ones of the data input terminals and the output element of each of the transistor switching means in a row being coupled to respective ones of said output terminals shifted in position as a function of control signals supplied on said control input terminals.

2. An array as in claim 1 wherein each of said transistor switching means is an MOSFET.

3. An array as in claim 1 wherein each of said transistor switching means is a pair of MOSFETs.

4. An array as in claim 1 wherein N is equal to eight, M is equal to four and P is equal to four such that said array is a 128-to-32 shifter.

5. An array as in claim 1 wherein N is equal to eight, M is equal to one and P is equal to four.

6. An array of barrel shifter circuits arranged into N groups of M shifter circuits per group wherein each barrel shifter circuit has P data input terminals, P control input terminals and P output terminals, N, M and P are integers, each of said output terminals of the barrel shifter circuits in a group being coupled to one another, respectively, so as to form N×P output terminals of said array, wherein each of said barrel shifter circuits comprises P columns by P rows of transistor switching means, each having an input and an output element and a control element wherein the control element of each switching means in a row is coupled to corresponding ones of the control input terminals, the input element of each of the transistor switching means in a column being coupled to corresponding ones of the data input terminals and the output element of each of the transistor switching means in a row being coupled to respective ones of said output terminals shifted in position as a function of control signals supplied on said control input terminals.

7. In a circuit arrangement for multiplexing bytes of data into various orders of arrangements of the bytes, an array of barrel shifter circuits arranged into N groups of M shifter circuits per group where N and M are both integers greater than one; and each barrel shifter circuit is disposed for receiving P data input signals and P control input signals and for providing P output signals on P output terminals, wherein P is a positive integer, each of said output terminals of the barrel shifter circuits in a group being coupled to one another, respectively, so as to form N×P output terminals of said array.

8. An array as in claim 7 wherein each of said shifter circuits comprises P columns by P rows of transistor switching means, each having an input and an output element and a control element wherein the control element of each switching means in a row is coupled to corresponding ones of the control input terminals, the input element of each of the transistor switching means in a column being coupled to corresponding ones of the data input terminals and the output element of each of the transistor switching means in a row being coupled to respective ones of said output terminals shifted in position as a function of control signals supplied on said control input terminals.

9. An array as in claim 8 wherein each of said transistor switching means is an MOSFET.

10. An array as in claim 8 wherein each of said transistor switching means is a pair of MOSFETs.

11. An array as in claim 8 wherein N is equal to eight, M is equal to four and P is equal to four such that said array is a 128-to-32 shifter.

12. An array as in claim 8 wherein N is equal to eight, M is equal to one and P is equal to four.

* * * * *